Figure 1:
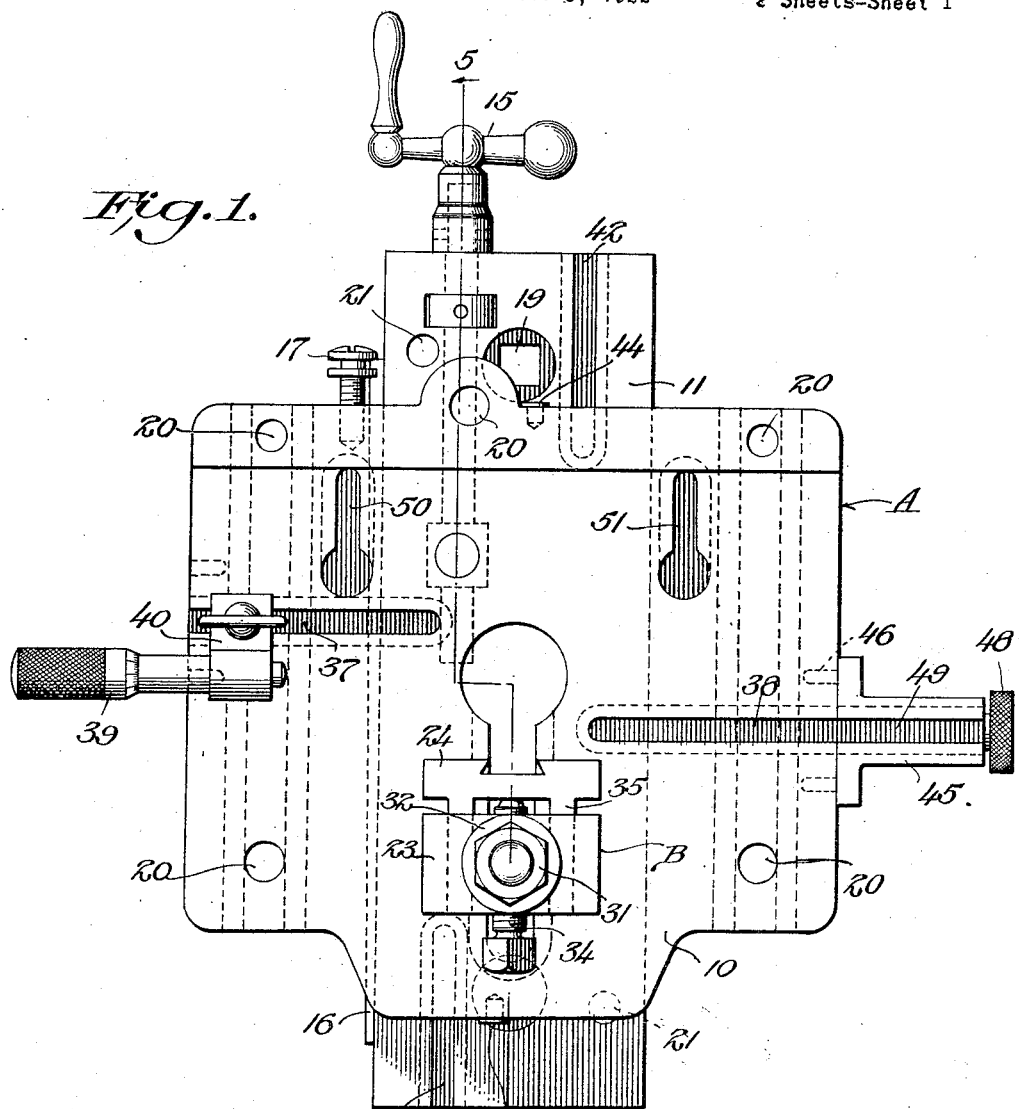

July 22, 1924.

A. J. JOHNSON ET AL 1,502,636

ADJUSTABLE CHUCK

Filed Nov. 8, 1922

2 Sheets-Sheet 1

INVENTORS
Alfred J. Johnson,
Chester Sliwonik,
BY Bright & Bailey Attys.

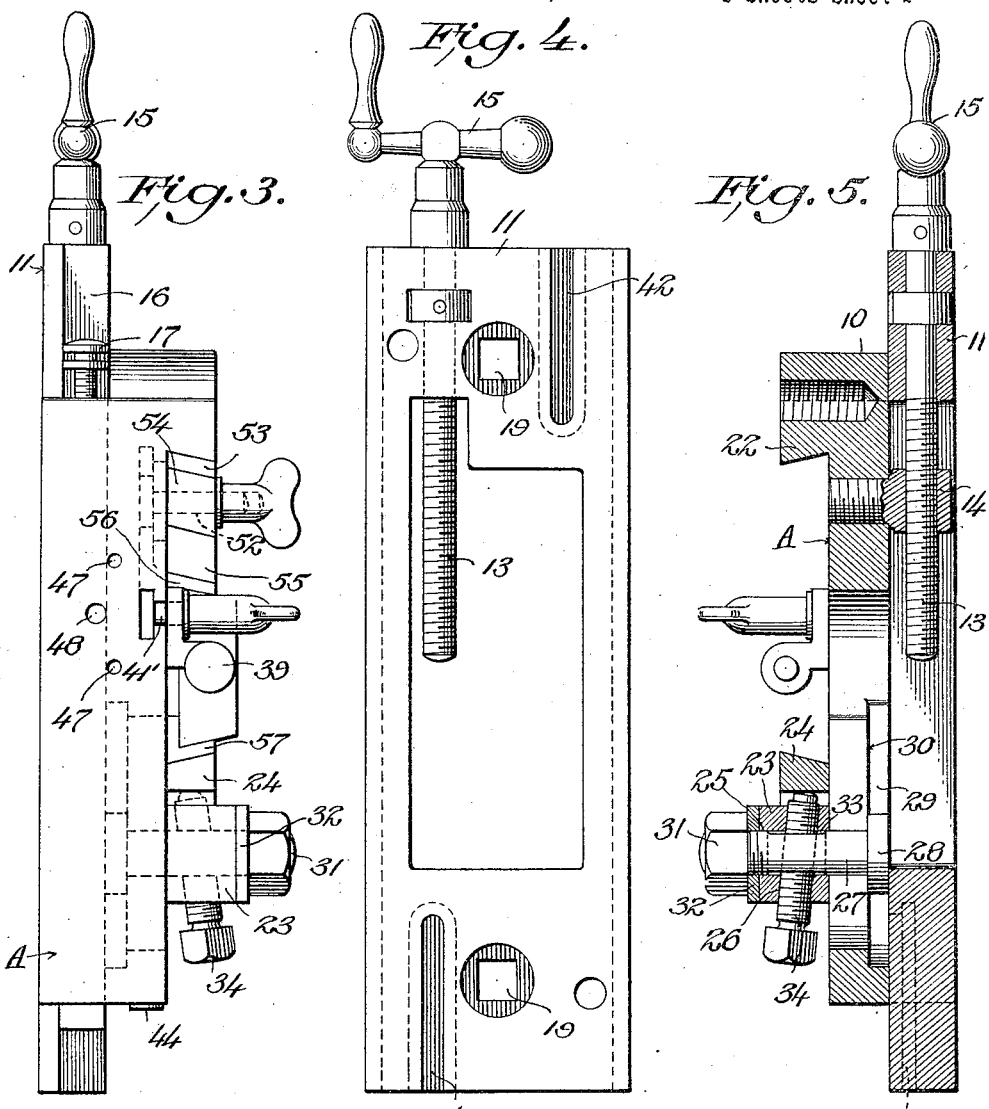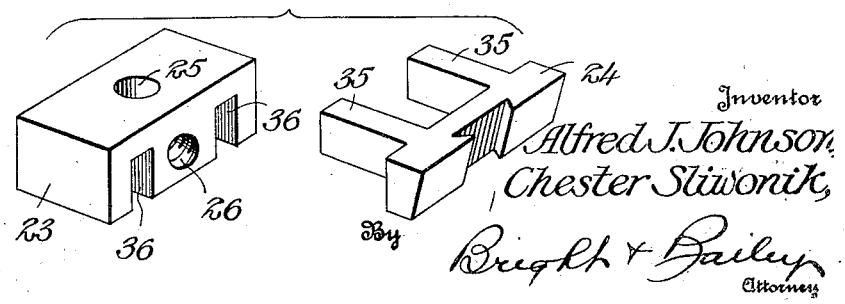

Patented July 22, 1924.

1,502,636

UNITED STATES PATENT OFFICE.

ALFRED JULIUS JOHNSON, OF FAIRFIELD, AND CHESTER SLIWONIK, OF BRIDGEPORT, CONNECTICUT.

ADJUSTABLE CHUCK.

Application filed November 8, 1922. Serial No. 599,704.

*To all whom it may concern:*

Be it known that we, ALFRED J. JOHNSON and CHESTER SLIWONIK, citizens of the United States, and residents of Fairfield, in the county of Fairfield and State of Connecticut, and Bridgeport, in the county of Fairfield and State of Connecticut, respectively, have invented certain new and useful Improvements in Adjustable Chucks, of which the following is a specification.

Our invention relates to adjustable chucks and while said invention is particularly adapted for positioning work on a lathe, it can also be utilized with facility in association with dies, jigs, etc.

In carrying our invention into practice it has been our purpose to produce a chuck of this type having improved features of construction which will eliminate the necessity of laying out the work; which will also eliminate the use of an indicator, straps and bolts; which can be removed from the face plate of a lathe and replaced in the same location without adjustment or measurement; which will assure absolutely accurate location of tool contact with the work; and which will save a relatively large amount of time in the operation of shifting the work from a location for one tool contact therewith to a location for the next tool contact.

We will describe our invention in the best form known to us at present, but it will be apparent that the same is susceptible to changes in forms and proportions and to desirable additions with the exercise of only ordinary mechanical skill and without departing from the scope thereof as defined in the appended claims.

In the drawings chosen to illustrate our invention—

Figure 2:
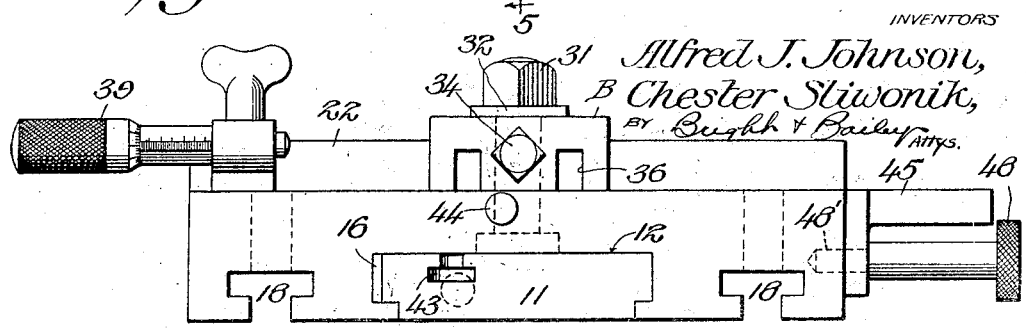

Figure 1 is a plan view of a chuck embodying our invention;

Figure 2, a view in elevation looking at the lowermost edge in Figure 1;

Figure 3, a view in elevation looking at the left hand edge in Figure 1 and showing parallels interposed between the clamping jaws and a clamped work element;

Figure 4, a plan view of one of the members of the base structure of the chuck;

Figure 5, a section on the line 5—5 of Figure 1; and

Figure 6, a detail perspective of the adjustable clamping jaw showing the parts thereof separated.

Referring to the drawings our improved chuck is shown as comprising a base structure A including a top member 10 and a bottom member 11. These members are slidably associated by engaging the member 11 in a groove 12 of T-shape cross section formed in the bottom of the member 10, said member 11 harmonizing in cross section with the groove. Relative sliding movement of the members 10 and 11 is effected by a screw 13 carried by the member 11 and operatively engaged through a nut 14 fixed to the member 10. A suitable handle 15 is provided on the screw 13 to effect convenient manual rotation thereof and consequent relative adjustment of the members 10 and 11. For the purpose of compensating for wear of the contacting surfaces of the members 10 and 11 we interpose between one wall of the groove 12 and the adjacent edge of the member 11 a wedge 16 which is adapted to be adjusted longitudinally by means of a screw 17 threaded in the member 10 and having rotatable interfitting connection with said wedge. The chuck is adapted to be secured to the face plate of a lathe in a manner well known and for which purpose grooves 18 of T-shape cross section are provided in the bottom of the member 10 and bolt openings 19 in the member 11. In addition we provide the member 10 with threaded holes 20 for clamping purposes in connection with jigs, fixtures, dies, etc., while the member 11 is provided with dowel pin receiving openings 21 through the instrumentality of which latter the chuck may be removed and replaced without loss of position with respect to its carrying element, such as the face plate of a lathe. From the foregoing construction it will be apparent that in order to effect relative adjustment of the members 10 and 11 when the chuck is mounted, it is only necessary to loosen the connections between member 10 and the carrying element and then rotate the screw 13.

For the purpose of clamping work elements we provide on the upper side of the member 10 a fixed jaw 22 and a movable or adjustable jaw B. This jaw B is formed of members 23 and 24 the former of which is provided with a vertical passage 25 and also a threaded passage 26 opening through the front and rear faces of the member and intersecting the passage 25. Adjustable connection between the member 23 and the member 10 is afforded by a bolt 27 extending through the passage 25 and through a slot 29 in the member with its head 28 slidably engaged in said slot 29 beneath a shoulder 30. The threaded end of this bolt projects beyond the upper face of the member 23 and has engaged thereon a nut 31, which latter may be operated to lock the member 23 in a desired adjustment with respect to member 10. If desirable a washer 32 may be interposed between the nut 31 and member 23. Engaged in the passage 26 and passing through an opening 33 in the bolt 27 is an adjusting screw 34 for a purpose which will presently appear. The member 24 of jaw B has slidable interfitting connection with the member 23 through the instrumentality of arms 35 thereon engaging in recesses 36 formed in the member 23. The screw 34 is adapted to engage the member 24 between the arms 35 for the purpose of adjusting said member relative to the member 23 to complete the clamping of the work element. As a result of the construction just described it will be obvious that by simply loosening the nut 31 a quick adjustment of the jaw B as a whole to the work to be clamped can be made and the screw 34 then operated to clamp the member 24 against the work.

To eliminate the necessity for laying out work or the use of indicators, straps and bolts and at the same time enhance the accuracy of the work, particularly in respect to the boring of holes predetermined distances apart, we provide in the upper side of the member 10 grooves 37 and 38 of T-shape cross section which open respectively through opposite side edges of the member and extend parallel to the clamping faces of the jaws 22 and B. We then provide a micrometer 39 adjustable in a bracket 40 and through this bracket pass a clamping bolt 41' whose head is adapted to be slidably engaged in the desired groove 37 or 38 to secure the micrometer to the member 10 as will be obvious, and thus convert said micrometer into an adjustable abutment for determining the position of one edge of the work. The construction just described is particularly advantageous in respect to accuracy and rapidity of adjustment when it is desired to bore a plurality of holes in the work parallel to the clamping faces of the jaws and predetermined distances apart. For instance, if it is desired to bore two holes five tenths of an inch apart it is only necessary to bore the first hole and then associate the micrometer with the member 10 through the medium of either groove 37 or 38. When thus associated, the bracket 40 is adjusted to bring the micrometer into contact with the adjacent edge of the work. The work is then loosened and the micrometer advanced five tenths of an inch which operation will move the work a corresponding distance. After this adjustment is effected, the work is clamped and the second hole bored. In performing the operation just described, it is convenient to have the micrometer adjusted to zero when brought into contact with the work before the latter is loosened, but this is not absolutely essential. Likewise, the operation can be varied without departing from the general principle or result, as for instance, the micrometer can be brought into contact with the work when adjusted to five-tenths of an inch and then adjusted to zero, when the work can be shifted manually against the micrometer and the desired adjustment had.

We also make a substantially similar provision for adjusting the work with respect to the tool when the holes are to be positioned in a line at right angles to the clamping face of the jaw 22 by providing the member 11 with grooves 42 and 43 of T-shape cross section, said grooves being adapted to receive the head of bolt 41' of the micrometer bracket in the same manner as the grooves 37 and 38. When the micrometer is associated with the member 11 through the instrumentality of the groove 42 and it is desired to shift the work five-tenths of an inch downwardly in Figure 1, the bracket 40 is adjusted, with the micrometer set at zero, so as to bring the micrometer into contact with the hardened plug 44 set in the member 10. The connection of the member 10 with the face plate of the lathe is then loosened and the screw 13 operated to move the member 10 downwardly in Figure 1 a sufficient distance to permit the micrometer to be advanced to five-tenths of an inch. The screw 13 is then operated to return member 10 against the micrometer set at five-tenths of an inch and the desired adjustment results. The connections between the member 10 and the face plate of the lathe are then tightened and the work proceeded with. If it is desired to adjust the work upwardly in Figure 1 the operation is substantially the same, except that the micrometer is initially set at five-tenths of an inch and then adjusted to zero when the member 10 is moved into contact therewith to effect the necessary adjustment. The same operations can be performed when the micrometer bracket 40 is associated with the groove 43.

To provide for the use of the micrometer 39 when the size of the work prohibits its association directly with the member 10 we employ an extension element 45 having studs 46 adapted to detachably interfit in recesses 47 in edges of the member 10 and on respective sides of the grooves 37 and 38. This extension element carries a screw 48 adapted to engage selectively in threaded recesses 48' formed in the member 10 to positively secure the extension to the member. A groove 49 corresponding to the grooves 37 and 38 is provided in the upper face of the extension and is so positioned as to form either a continuation of the groove 37 or groove 38 when the extension is applied, to thus permit adjustment of the micrometer beyond a normal limit of the member 10.

In the upper side of the member 10 we provide grooves 50 and 51 of T-shape cross section for adjustably retaining the heads of clamping bolts 52 where it is desired to clamp down parallels interposed between the jaws and the work. Such parallels are shown at 53, 54, 55, 56, 57, and 58 in Figure 3.

We claim:—

1. A chuck of the class described comprising a base structure carrying cooperating work clamping jaws, one of said jaws including a member having sliding adjustable connection with the base structure and a second member slidably adjustable with respect to the first member, a slotted clamping bolt extending through said first member, and a screw for adjusting said second member with respect to said first member, said screw being threaded in said first member and extending through the slot in said bolt.

2. A chuck of the kind described comprising a base structure consisting of a pair of connected members the first of which is adapted to be fixed to a support and the second of which is adjustable with respect to the first, work clamping means on said adjustable member, and a work positioning stop device interchangeably engageable with said members, said device when engaged with one of said members being adapted to contact with the other member to determine the position of the work with respect to the first member, and when engaged with the second member being adapted to contact with the work to determine the position of the work with respect to said second member.

3. A chuck of the kind described comprising a base structure consisting of a pair of connected members the first of which is adapted to be fixed to a support and the second of which is adjustable with respect to the first, work clamping means on said adjustable member, and a measuring instrument interchangeably engageable with said base constituting a work positioning stop, said instrument when engaged with one of said members being adapted to contact with the other member to determine the position of the work with respect to the first member, and when engaged with the second member being adapted to contact with the work to determine the position of the work with respect to said second member.

4. A chuck of the kind described comprising a base structure consisting of a pair of connected members, the first of which is adapted to be fixed to a support and the second of which is adjustable with respect to the first, work clamping means on said adjustable member, and a measuring instrument constituting a stop engageable with said first member for contact with the second member to determine the position of the work with respect to the first member.

5. In a chuck of the class described, a base structure having a groove opening through one limiting edge thereof for adjustably receiving the securing means of a work positioning abutment and a grooved extension detachably securable against a limiting edge of the base structure in position to aline the groove therein with the groove in the base structure and thereby permit adjustment of a work positioning abutment beyond a normal limit of the base structure.

ALFRED JULIUS JOHNSON.
CHESTER SLIWONIK.